(12) United States Patent
Kitamura et al.

(10) Patent No.: US 10,969,831 B2
(45) Date of Patent: Apr. 6, 2021

(54) KEYBOARD DEVICE AND ELECTRONIC APPARATUS

(71) Applicant: LENOVO (SINGAPORE) PTE. LTD., Singapore (SG)

(72) Inventors: Masahiro Kitamura, Yokohama (JP); Satoshi Douzono, Yokohama (JP); Kazumi Nakaju, Yokohama (JP); Takanori Koike, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 16/558,312

(22) Filed: Sep. 3, 2019

(65) Prior Publication Data

US 2020/0387198 A1 Dec. 10, 2020

(30) Foreign Application Priority Data

Jun. 4, 2019 (JP) .............................. JP2019104495

(51) Int. Cl.
*G06F 1/16* (2006.01)
(52) U.S. Cl.
CPC .................. *G06F 1/1662* (2013.01)
(58) Field of Classification Search
CPC combination set(s) only.
See application file for complete search history.

(56) References Cited

U.S. PATENT DOCUMENTS

| 6,992,657 | B2* | 1/2006 | Huang | G06F 3/0221 |
| | | | | 341/22 |
| 8,982,543 | B2* | 3/2015 | Wang | G06F 3/0221 |
| | | | | 361/679.11 |
| 10,714,279 | B1* | 7/2020 | Horiuchi | H01H 13/70 |
| 2011/0042195 | A1* | 2/2011 | Tsai | H01H 25/041 |
| | | | | 200/5 A |
| 2011/0290628 | A1* | 12/2011 | Tsai | H01H 3/125 |
| | | | | 200/5 A |
| 2013/0135808 | A1* | 5/2013 | Huang | G06F 1/1662 |
| | | | | 361/679.09 |
| 2014/0111926 | A1* | 4/2014 | Reid | G06F 1/203 |
| | | | | 361/679.09 |
| 2020/0064926 | A1* | 2/2020 | Chen | G02B 6/0088 |

FOREIGN PATENT DOCUMENTS

JP 2019008761 A 1/2019

* cited by examiner

*Primary Examiner* — Van N Chow
(74) *Attorney, Agent, or Firm* — Shimokaji IP

(57) ABSTRACT

A keyboard device is provided with a base plate configured by arranging a plurality of plate members, a plurality of keytops vertically movably supported on the upper surface side of the base plate, a frame attached to the upper surface side of the base plate and having a plurality of hole portions into which the keytops are vertically movably inserted, and a fastening tool provided at a position overlapping with a plate boundary portion formed between the facing end surfaces of the plate members adjacent to each other and simultaneously fastening the adjacent plate members to the frame.

7 Claims, 8 Drawing Sheets

KEYBOARD DEVICE AND ELECTRONIC APPARATUS

FIELD OF THE INVENTION

The present invention relates to a keyboard device and an electronic apparatus provided with the keyboard device.

BACKGROUND OF THE INVENTION

As a keyboard device for use in an electronic apparatus, such as a Laptop PC, an isolation structure in which keytops are partitioned by a frame is mentioned. The isolation keyboard device can configure a flat operation surface and has high appearance quality. Moreover, the keyboard device can reduce gaps between the keytops, i.e., gaps between the keytops and the frame, to be smaller than gaps in common keyboard devices which are not the isolation type, and therefore can also suppress the falling of dust and dirt, for example, in the keyboard device.

The present inventors have proposed a keyboard device in which a base plate contains a plurality of plate members in Japanese Patent No. 6412626. According to this configuration, the base plate has a divided structure, and therefore gaps between keytops and a frame are minimized while suppressing the interference between the keytops and the frame due to assembly tolerance or the like.

SUMMARY OF THE INVENTION

In the configuration of Japanese Patent No. 6412626 above, the base plate and the frame are fixed through a latch fitting portion. When the fixing strength of such a base plate and such a frame needs to be further improved, it is considered to use fastening tools, such as a screw and a rivet, in place of the latch fitting portion or together with the latch fitting portion.

In the base plate of the divided structure described above, edge portions of the divided plate members receive a load in the sinking direction in a depressing operation of the keytops, and therefore it is desirable that the baseplate and the frame can be certainly fixed. However, the keyboard device has many limitations in the installation position of the fastening tool from the viewpoint of preventing the fastening tool from interfering with the stroke of each keytop. Moreover, when the number of the used fastening tools is excessively large, the keyboard device has problems in terms of cost, weight, working efficiency, and the like.

The present invention has been made in consideration of the problems of the conventional technique described above. It is an object of the present invention to provide a keyboard device capable of reducing the cost or the weight while securing the rigidity of a base plate and an electronic apparatus provided with the keyboard device.

A keyboard device according to a first aspect of the present invention is a keyboard device provided with a base plate configured by arranging a plurality of plate members, a plurality of keytops vertically movably supported on the upper surface side of the base plate, a frame attached to the upper surface side of the base plate and having a plurality of hole portions into which the keytops are vertically movably inserted, and a fastening tool provided at a position overlapping with a plate boundary portion formed between the facing end surfaces of the plate members adjacent to each other and simultaneously fastening the adjacent plate members to the frame.

A configuration may be acceptable in which the plate boundary portion has a zigzag shape bent in the forward and rearward direction and the right and left direction of the keyboard device, a projected corner portion formed by the zigzag shape is formed in one of the adjacent plate members, and the fastening tool is provided at a position at least overlapping with the plate boundary portion forming the projected corner portion.

A configuration may be acceptable in which the adjacent plate members each have a notch-shaped portion in the end surface, the notch-shaped portions of the adjacent plate members are disposed to face each other, and the fastening tool is passed through a gap formed between the notch-shaped portions facing each other.

A configuration may be acceptable in which the fastening tool is a screw having a screw portion and a head portion and, in the screw, the screw portion is passed through the plate boundary portion and the head portion abuts on each of the adjacent plate members.

A configuration may be acceptable in which the base plate has a joint portion connecting the adjacent plate members so as to be slidable in a predetermined slide range along the arrangement direction thereof, the joint portion is provided to straddle the plate boundary portion, and a portion straddling the plate boundary portion is fastened to the frame by the fastening tool.

An electronic apparatus according to a second aspect of the present invention is provided with the keyboard device of the above-described configuration, a main body chassis provided with the keyboard device, and a display chassis rotatably coupled to the main body chassis and having a display.

A configuration may be acceptable in which the frame is a cover member forming the upper surface of the main body chassis and the base plate is fastened to the cover member with the fastening tool so as to be attached to the main body chassis in a state of being suspended from the lower surface side of the cover member.

The above-described aspects of the present invention can reduce the cost and the weight while securing the rigidity of the base plate.

DETAILED DESCRIPTION OF THE INVENTION

Hereinafter, a keyboard device according to the present invention is described in detail with reference to the attached drawings giving preferable embodiments describing an electronic apparatus provided with the device as an example.

Figure 1:
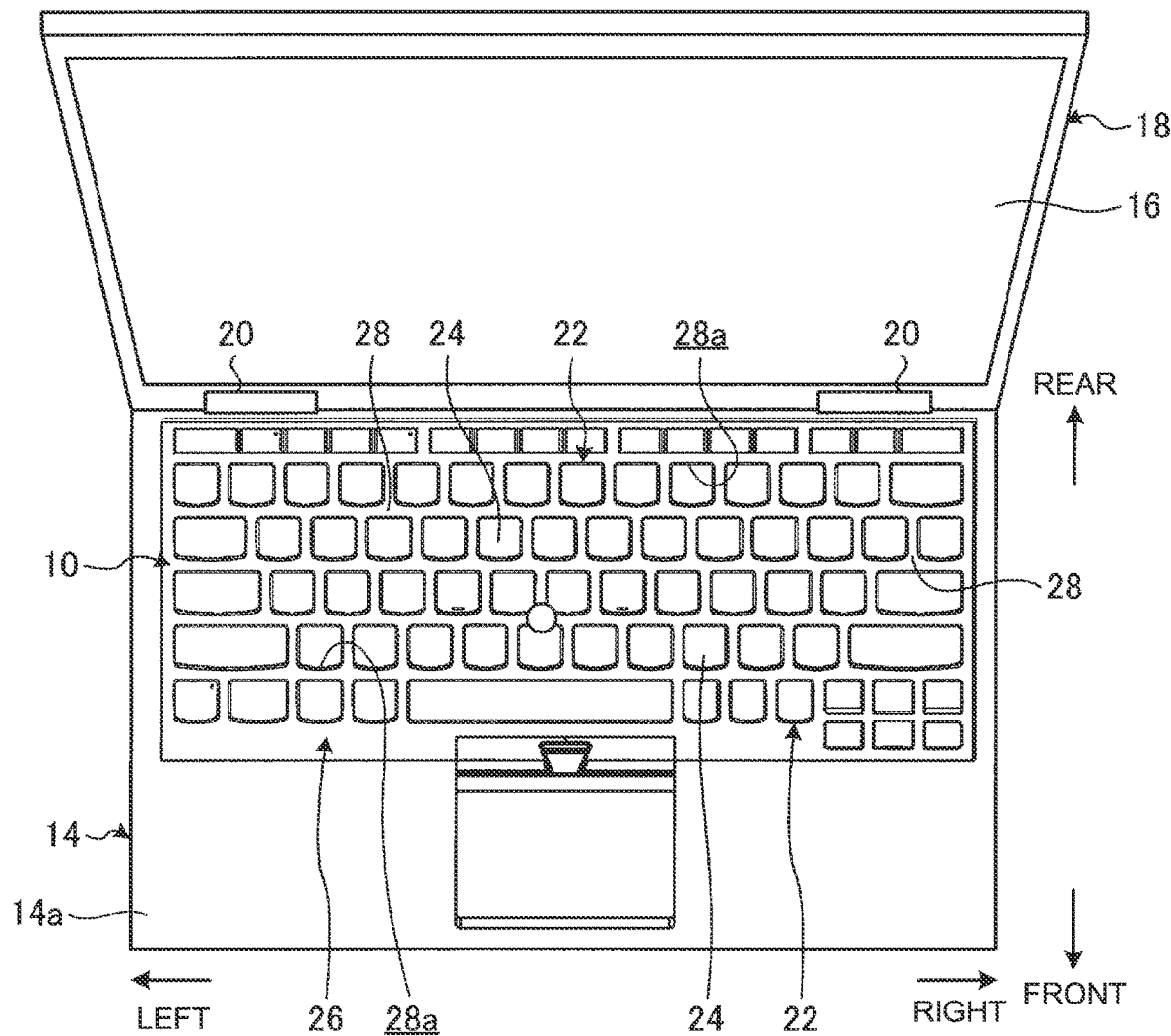
FIG. 1 is a plan view of an electronic apparatus provided with a keyboard device according to one embodiment.

FIG. 1 is a plan view of an electronic apparatus 12 provided with a keyboard device 10 according to one embodiment. The electronic apparatus 12 is a Laptop PC in which a main body chassis 14 mounting the keyboard device 10 and a display chassis 18 mounting a display 16 are rotatably coupled with hinges 20. FIG. 1 is a plan view in a state where the display chassis 18 is opened from the main body chassis 14 to be brought into a use form. The keyboard device 10 may be mounted in an electronic apparatus other than the Laptop PC. The keyboard device 10 may be an external keyboard device for use in a desktop PC, for example.

Hereinafter, the keyboard device 10 is described referring to the front side as "front", the deep side as "rear", the thickness direction as "top and bottom", and the width direction as "right and left" based on a state where the keyboard device 10 mounted in the electronic apparatus 12 as illustrated in FIG. 1 is viewed from a user using the same.

The main body chassis 14 accommodates various kinds of electronic components, such as a substrate, an arithmetic processing unit, a hard disk drive, and a battery device, which are not illustrated thereinside. The keyboard device 10 is formed so as to be exposed to the upper surface of the main body chassis 14. The display 16 is a liquid crystal display, for example. In the display chassis 18, a lower end portion thereof is coupled to a rear end portion of the main body chassis 14 through the hinges 20.

The keyboard device 10 has a plurality of key switches 22. The keyboard device 10 is an isolation keyboard device in which the periphery of a keytop 24 serving as the operation surface of each key switch 22 is partitioned with a frame (isolation frame) 26.

Figure 2:
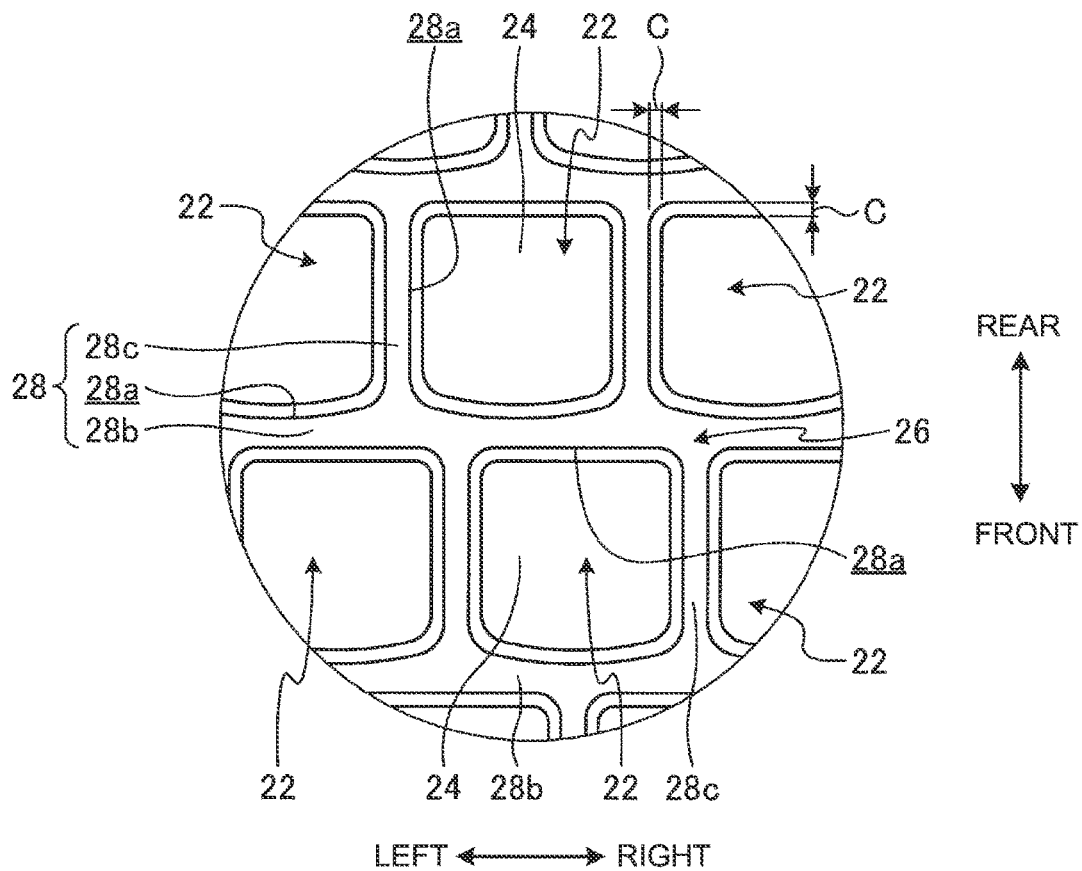
FIG. 2 is a plan view in which a part of the keyboard device is enlarged.
Figure 3:
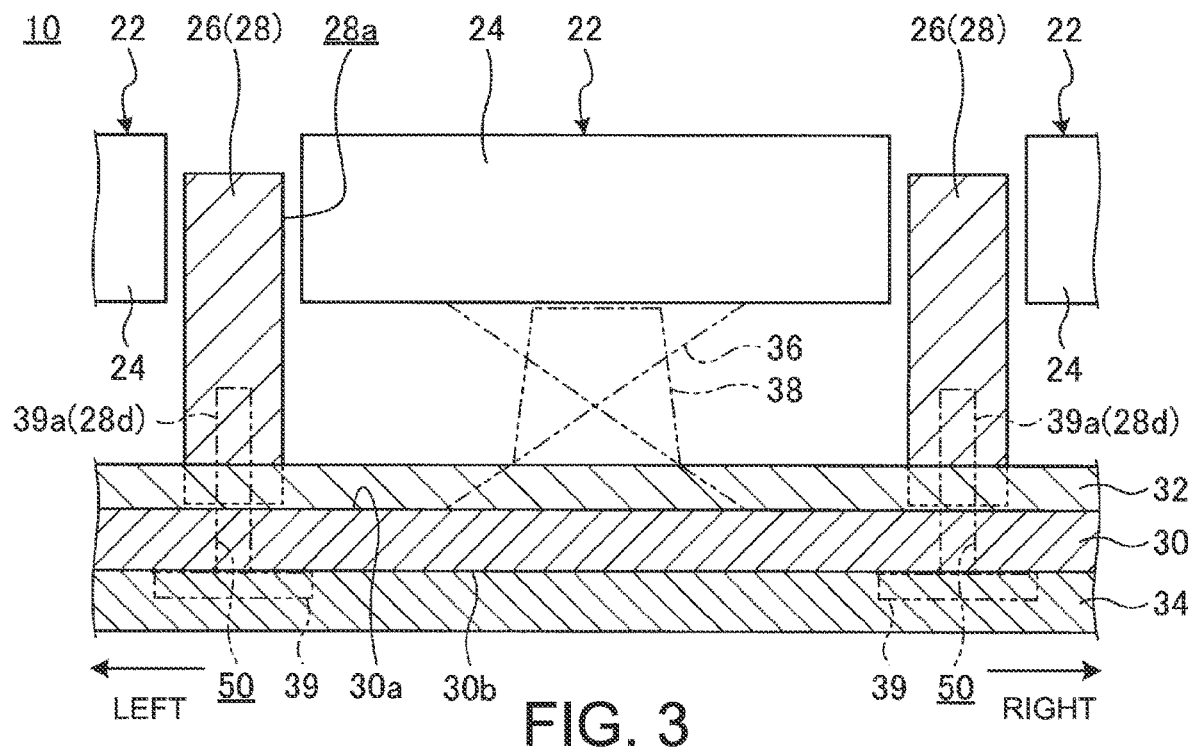
FIG. 3 is a partially enlarged side surface cross-sectional view schematically illustrating the configuration of the keyboard device.

FIG. 2 is a plan view in which a part of the keyboard device 10 is enlarged. FIG. 3 is a partially enlarged side surface cross-sectional view schematically illustrating the configuration of the keyboard device 10. As illustrated in FIGS. 1 to 3, the keytops 24 are sectioned from the other adjacent keytops 24 by frame portions 28 of the frame 26 to be individually independently disposed.

The frame 26 is formed of resin, metal, or the like. The frame 26 is provided with a plurality of hole portions 28a. The frame portions 28 are portions where the hole portions 28a are formed and form a mesh shape along the forward and rearward direction and the right and left direction. The arrangement of the hole portions 28a coincides with the arrangement of the keytops 24. Into each hole portion 28a, each keytop 24 is vertically movably inserted. In the frame 26, the upper surface thereof is substantially flush with or located at a position somewhat lower than the upper surface of the main body chassis 14 and the operation surface of each keytop 24 (see FIG. 3). The frame 26 of this embodiment is integrally formed with a cover member 14a (see FIG. 1) configuring the upper surface of the main body chassis 14. The frame 26 may be configured separately from the cover member 14a.

The frame portion 28 has a horizontal frame 28b and a vertical frame 28c forming the hole portion 28a. As illustrated in FIG. 1, the key switches 22 are principally arranged in a row in the right and left direction (transverse direction) except a right front end position. The key switches 22 are arranged to be displaced in the right and left direction except both right and left end positions in the forward and rearward direction (vertical direction). More specifically, the horizontal frames 28b extend in the right and left direction except the right front end position. On the other hand, the vertical frames 28c form a zigzag shape bent in the forward and rearward direction and the right and left direction except both the right and left end positions.

As illustrated in FIG. 3, the keyboard device 10 is provided with the plurality of key switches 22, a base plate 30, a membrane sheet 32, and a back light sheet 34.

Each key switch 22 has a keytop 24, a guide mechanism 36, and a rubber dome 38. The guide mechanism 36 vertically movably supports the keytop 24 on the side of an upper surface 30a of the base plate 30. The guide mechanism 36 is a pantograph mechanism coupling the lower surface of the keytop 24 and the upper surface 30a of the base plate 30. The rubber dome 38 is a dome shaped member formed of an elastic material having flexibility, such as silicone rubber, and is disposed between the membrane sheet 32 and the keytop 24. The rubber dome 38 is an elastic member pressing the membrane sheet 32 when the keytop 24 is depressed and returning the keytop 24 to the original position when the depressing operation of the keytop 24 is released.

The base plate 30 is a mounting plate of each key switch 22 or the frame 26. The base plate 30 is obtained by applying lancing molding or punch molding to a metal plate-like member, such as a stainless steel plate or an aluminum plate having a plate thickness of 0.3 mm, for example. The base plate 30 of this embodiment has a divided structure in which the base plate 30 is divided into three parts in the longitudinal direction (right and left direction), the details of which are described later.

The membrane sheet 32 is laminated on the upper surface 30a side of the base plate 30. The membrane sheet 32 is a switch sheet of a three-layer structure, contact points of which are closed when pressed, for example. In the membrane sheet 32, when a position where a fixed contact and a movable contact overlap with each other are pressed, the fixed contact and the movable contact are brought into close contact with each other, whereby the contact points are closed, for example. The membrane sheet 32 has through-holes in various places. The guide mechanism 36 or the frame portion 28 lands on the upper surface 30a of the base plate 30 through the through-holes. The membrane sheet 32 may be laminated on the side of a lower surface 30b of the base plate 30.

The back light sheet 34 is laminated on the lower surface 30b side of the base plate 30. The back light sheet 34 includes a resin optical guide plate and the like having translucency, such as PET, polycarbonate, and acryl, for example, and has a light source, such as an LED element, in the center in the right and left direction or right and left end portions. The back light sheet 34 guides light emitted from the light source in the right and left direction, reflects the light on the light reflecting surface, and then irradiates each keytop 24 with the light from the rear surface. The back light sheet 34 may be omitted and a waterproof sheet may be used in place of the back light sheet 34 in this case.

Figure 4A:
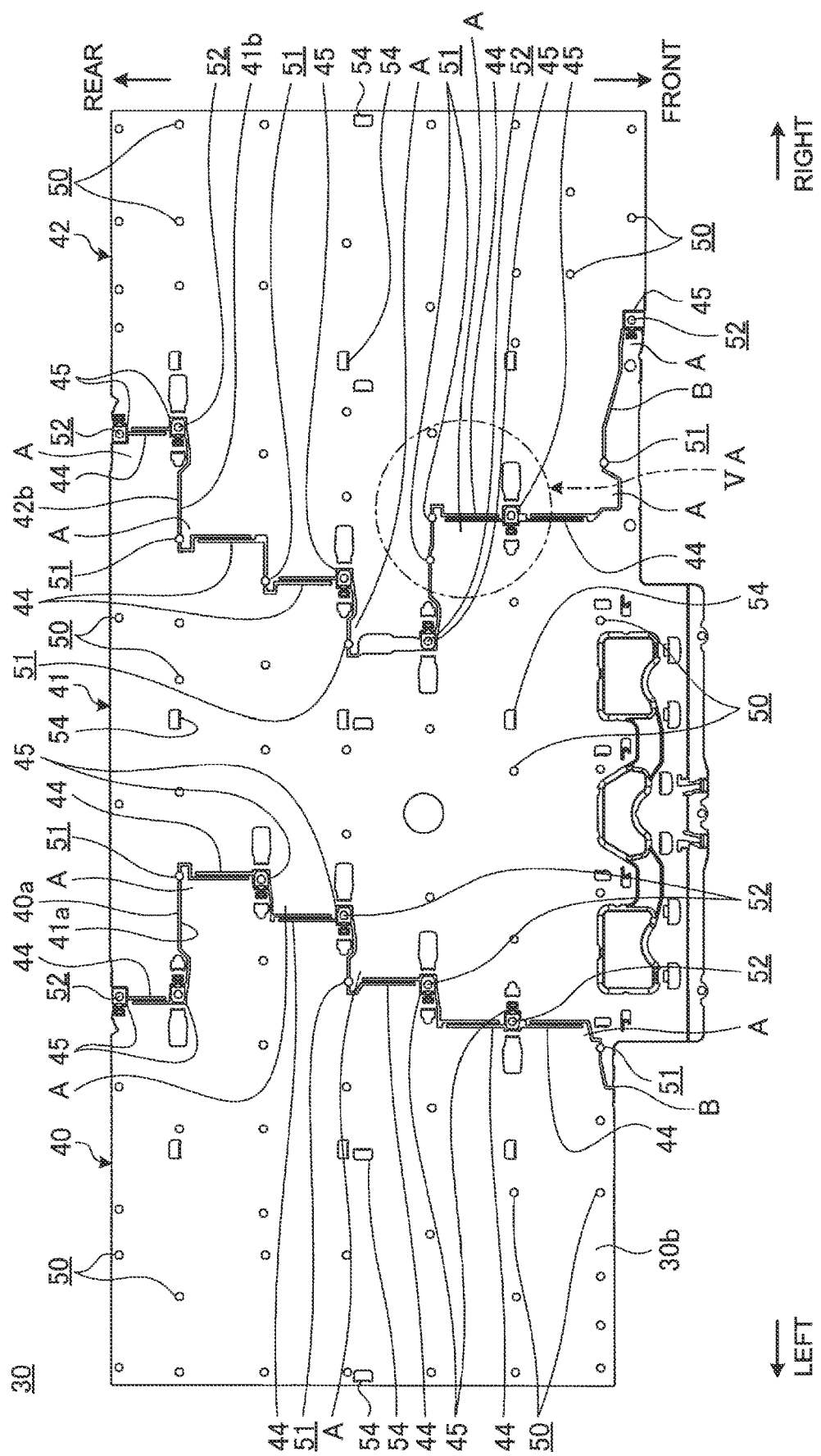
FIG. 4A is a plan view of a base plate.
Figure 4B:
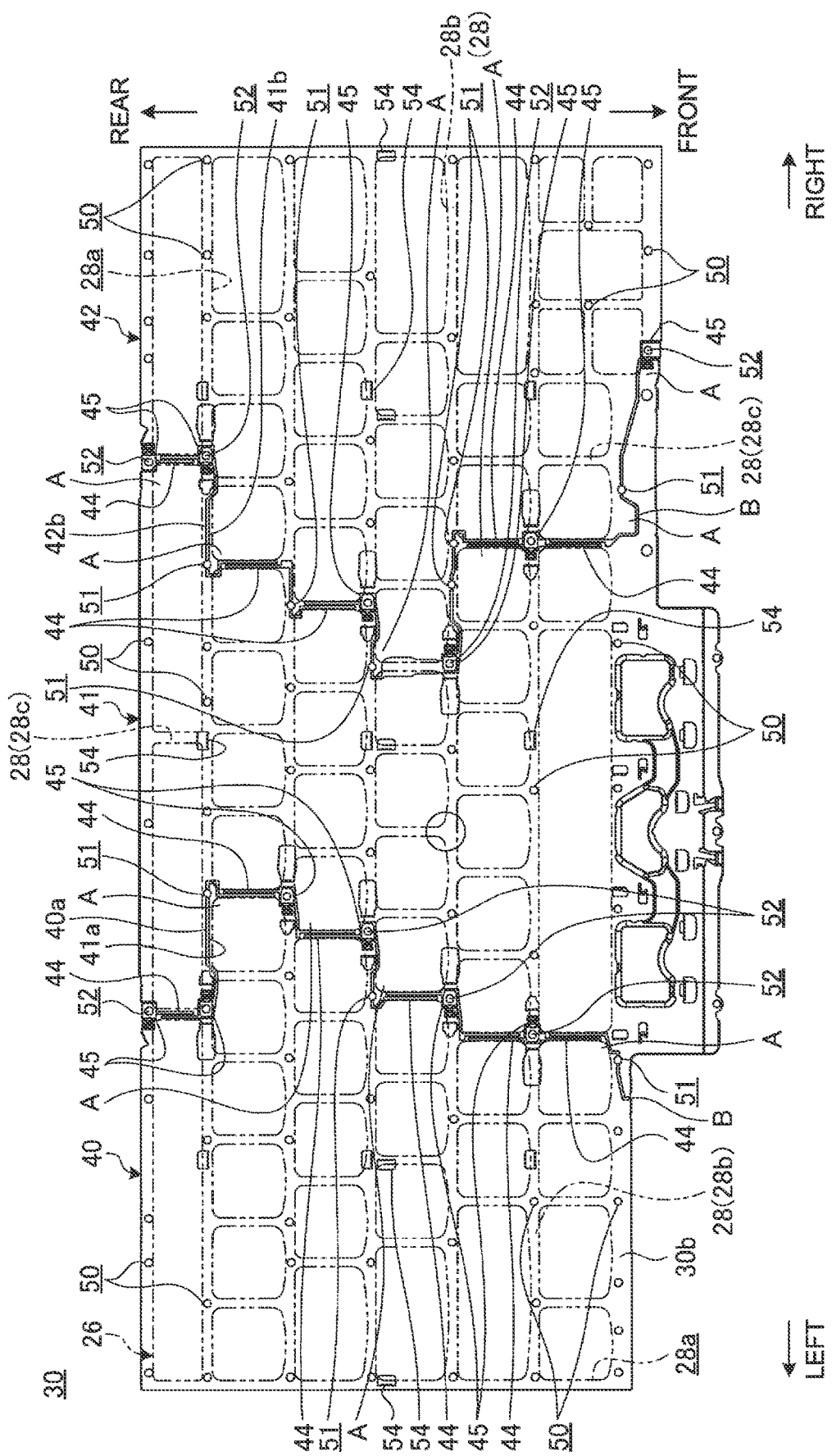
FIG. 4B is a plan view in a state where frame portions of a frame are superposed on the upper surface of the base plate illustrated in FIG. 4A.
Figure 5A:
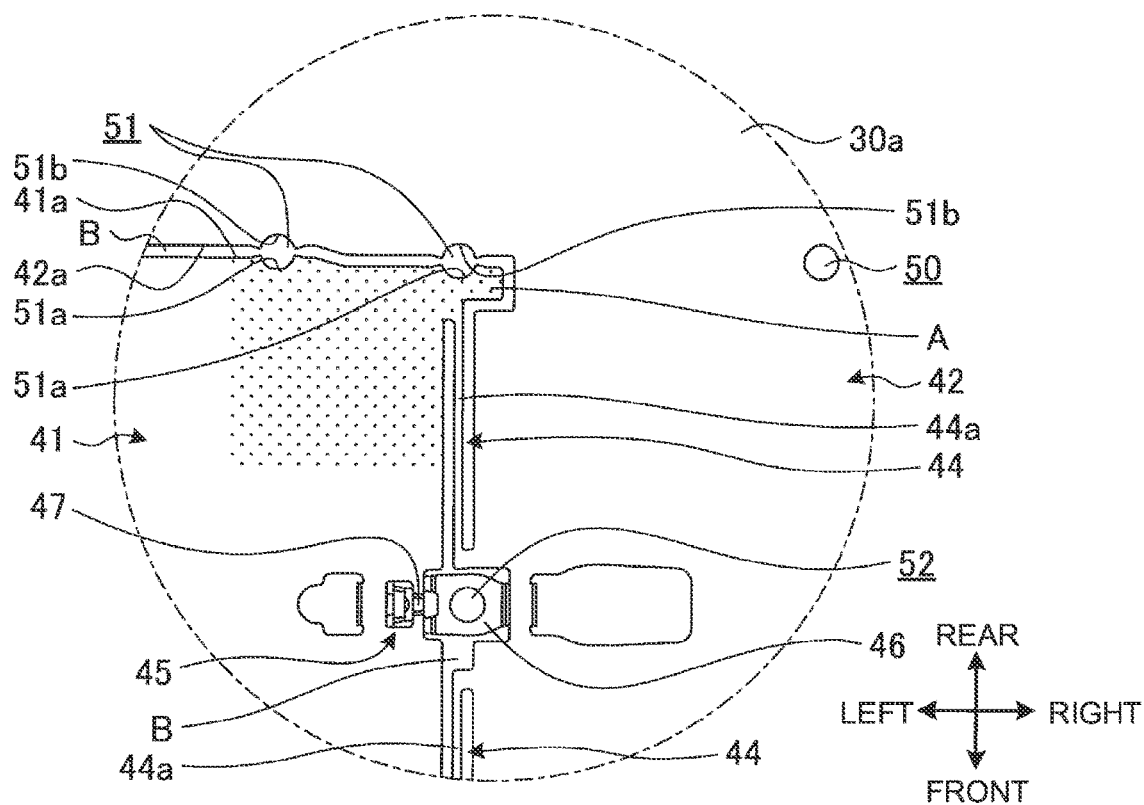
FIG. 5A is a plan view of a portion enclosed with a circle mark VA in FIG. 4A.
Figure 5B:
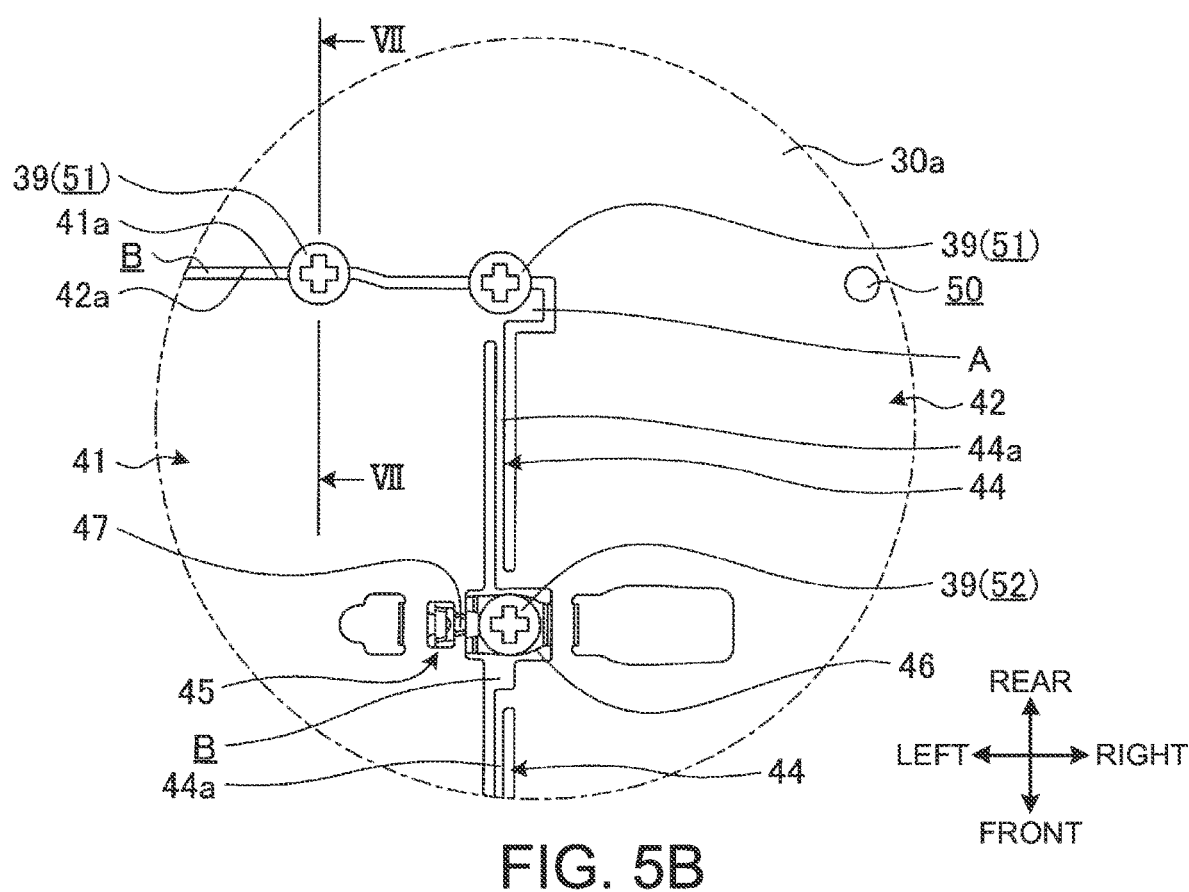
FIG. 5B is a plan view in a state where the base plate illustrated in FIG. 5A is fastened to the frame using screws.
Figure 6A:
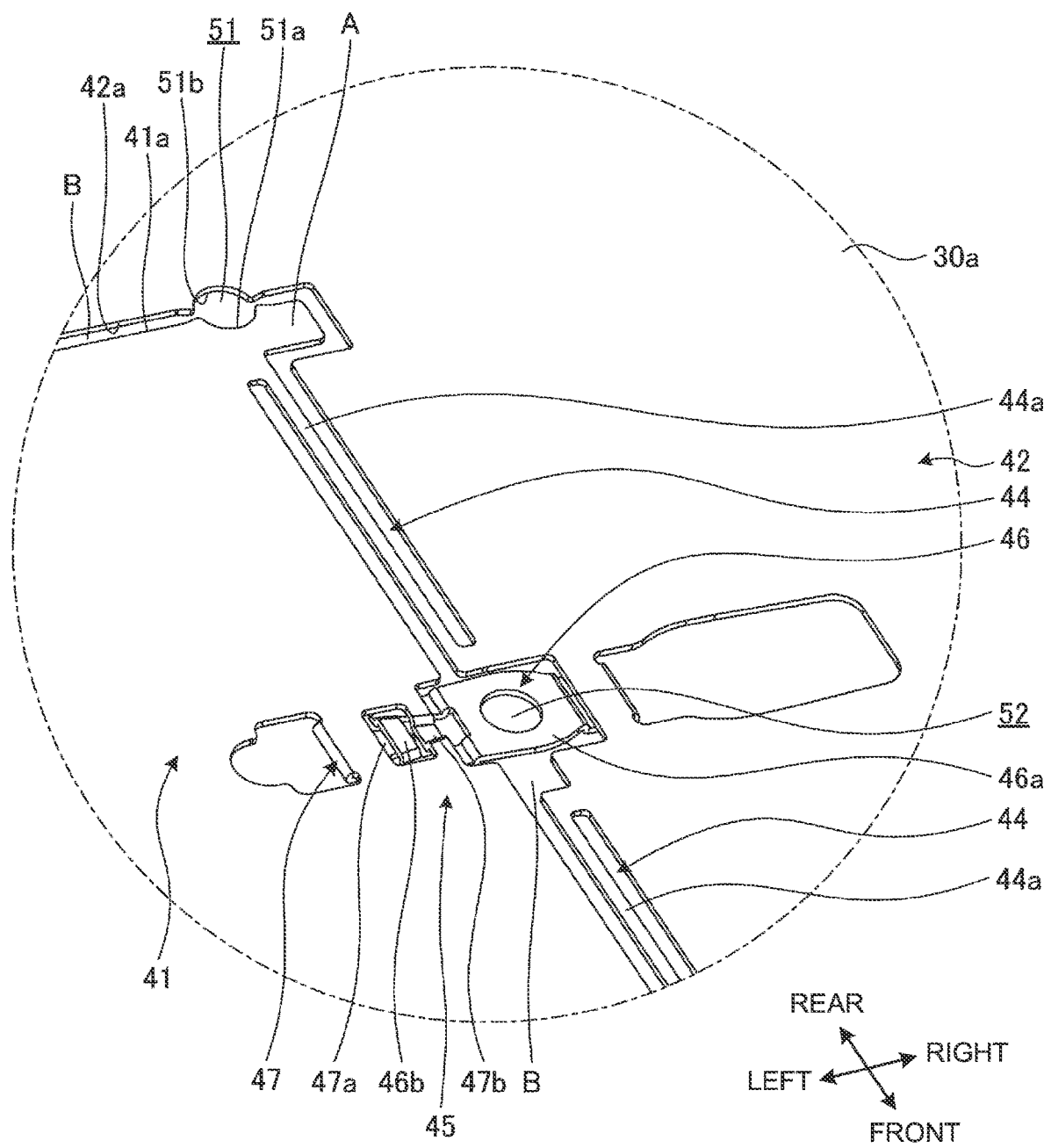
FIG. 6A is a perspective view in which a portion illustrated in FIG. 5A of the base plate is viewed from the upper surface side.
Figure 6B:
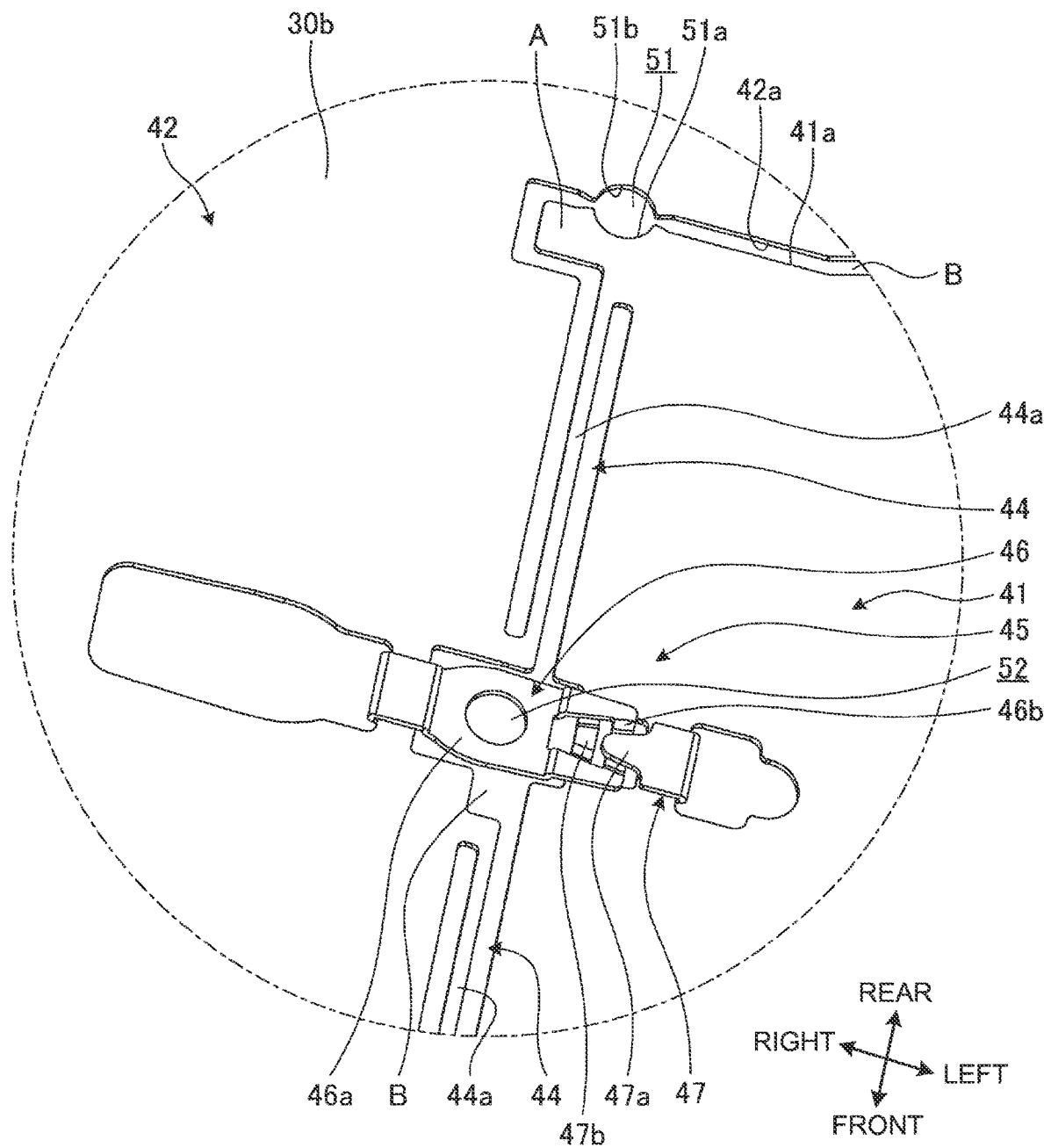
FIG. 6B is a perspective view in which a portion illustrated in FIG. 5A of the base plate is viewed from the lower surface side.
Figure 7:
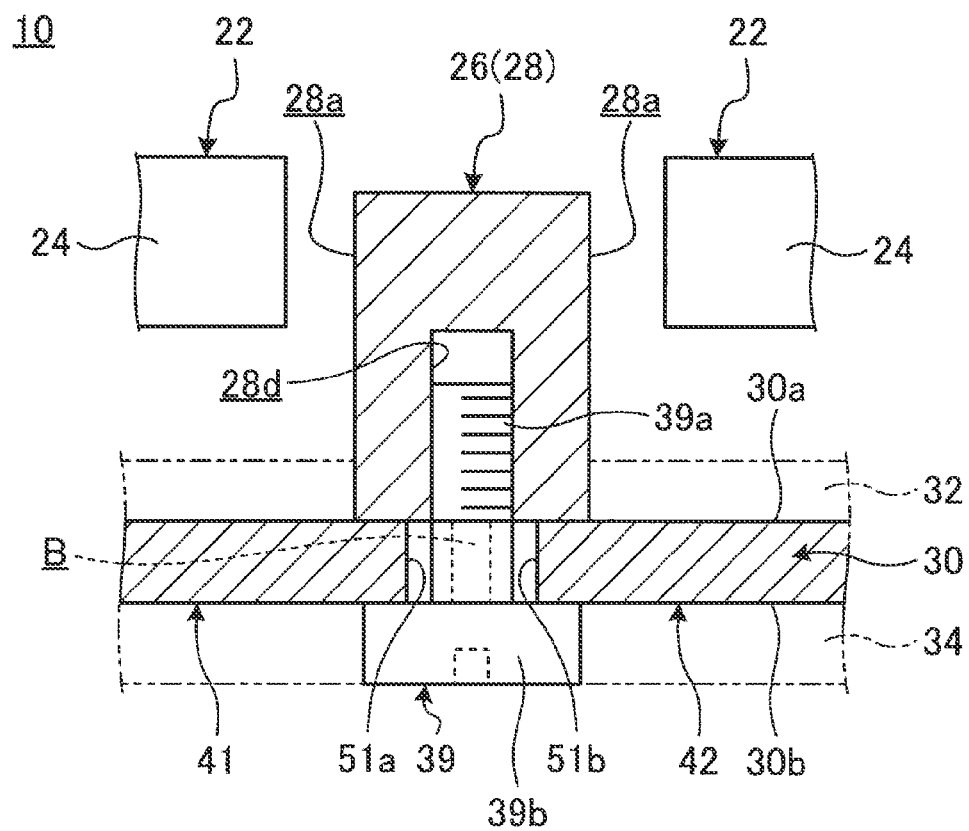
FIG. 7 is a schematic cross-sectional view indicated by the VII-VII line in FIG. 5B.

FIG. 4A is a plan view of the base plate 30. FIG. 4B is a plan view in a state where the frame portions 28 of the frame 26 are superposed on the upper surface 30a of the base plate 30 illustrated in FIG. 4A, in which the frame 26 is illustrated by the chain double-dashed line. FIG. 5A is a plan view of a portion enclosed with a circle mark VA in FIG. 4A. FIG. 5B is a plan view in a state where the base plate 30 illustrated in FIG. 5A is fastened to the frame 26 using screws 39. FIG. 6A is a perspective view in which a portion illustrated in FIG. 5A of the base plate 30 is viewed from the upper surface 30a side. FIG. 6B is a perspective view in which a portion illustrated in FIG. 5A of the base plate 30 is viewed from the lower surface 30b side. FIG. 7 is a schematic cross-sectional view indicated by the VII-VII line in FIG. 5B.

As illustrated in FIGS. 4A and 4B, the base plate 30 has a divided structure in which three plate members 40, 41, 42 are arranged along the longitudinal direction (right and left direction). In the base plate 30 of this embodiment, the adjacent plate members 40, 41 and the adjacent plate members 41, 42 are individually connected with a plurality of bridge portions 44, 45.

The plate member 40 is a plate configuring a left side portion of the base plate 30. The plate member 41 is a plate configuring a center portion of the base plate 30. The plate member 42 is a plate configuring a right side portion of the base plate 30. The adjacent plate members 40, 41 are disposed between end surfaces 40a, 41a facing each other through a plate boundary portion B. Similarly, the adjacent plate members 41, 42 are disposed between end surfaces 41b, 42a facing each other through a plate boundary portion B. The plate boundary portions B are boundary lines between the adjacent plate members 40, 41 and between the plate members 41, 42. The plate boundary portions B of this embodiment are gaps formed between the end surfaces 40a, 41a and between the end surfaces 41b, 42a.

The end surfaces 40a, 41a face each other while drawing a zigzag shape bent in the forward and rearward direction and the right and left direction. Similarly, the end surfaces 41b, 42a face each other while drawing a zigzag shape bent in the forward and rearward direction and the right and left direction. More specifically, each plate boundary portion B divides the plate members 40 to 42 in the zigzag shape bent in the forward and rearward direction and the right and left direction.

The bridge portions 44, 45 relatively movably connect the adjacent plate members 40, 41 and the adjacent plate members 41, 42 in the arrangement direction (right and left direction) of the plate members 40 to 42. More specifically, the adjacent plate members 40, 41 and the adjacent plate members 41, 42 are relatively movably connected to each other in a direction where the plate boundary portions B expand and contract in the right and left direction through the bridge portions 44, 45.

5 or 6 bridge portions 44 are provided for one plate boundary portion B, for example. The bridge portions 44 are narrow-width plates having a substantially Z shape as viewed in plan which are partially left behind without being cut when the plate members 40, 41 and the plate members 41, 42 are cut along the plate boundary portions B, for example.

As illustrated in FIGS. 5A and 6A, the bridge portion 44 has an elastic arm 44a connecting the end surfaces 41a, 42a of the plate members 41, 42 in a Z shape, for example. The elastic arm 44a is a plate piece projecting from one end surface 41a to the end surface 42a side facing the same, extending along the extension direction of a gap G, and then crooked to the end surface 42a side. The bridge portion 44 between the plate members 40, 41 also has substantially the same configuration as that illustrated in FIGS. 5A and 6A. The bridge portions 44 elastically displaceably couple the plate members 40, 41 and the plate members 41, 42 along the right and left direction where the plate members 40, 41 and the plate members 41, 42 are brought into contact with and separated from each other by the elastic deformation of the elastic arm 44a.

Six bridge portions 45 are provided for one plate boundary portion B, for example, and straddle the plate boundary portion B in the right and left direction. The bridge portions 45 are engagement portions where the plate members 40, 41 and the plate members 41, 42 configuring the plate boundary portions B are individually cut and raised, and then engaged.

As illustrated in FIGS. 6A and 6B, the bridge portion 45 contains an engagement arm 46 and an arm support portion 47.

The engagement arm 46 is one obtained by cutting and raising a part of one plate member 42, reversing the one plate member 42 by 180°, and then causing the reversed one plate member 42 to project to the other plate member 41 side. The engagement arm 46 is provided to straddle the plate boundary portion B and the tip side thereof is engaged with the arm support portion 47. The engagement arm 46 has an arm base 46a and a first locking portion 46b. The arm base 46a is a broad plate portion disposed in the plate boundary portion B. The first locking portion 46b is provided on the tip side with respect to the arm base 46a. The tip of the engagement arm 46 is branched in two parts and the branched two parts project in two horn shapes. A horizontal plate portion connecting the tips of the two horns serves as the first locking portion 46b.

The arm support portion 47 is a portion provided in the other plate member 41 and slidably supporting the engagement arm 46 in the right and left direction. The arm support portion 47 has a guide piece 47a and a second locking portion 47b. The guide piece 47a is one obtained by cutting and raising a part of the plate member 41, reversing the plate member 41 by 180°, and then causing the reversed plate member 41 to project to the plate member 42 side. The guide piece 47a is a tapered plate piece. The guide piece 47a is provided under the first locking portion 46b to overlap with the same to support the lower surface of the first locking portion 46b. The second locking portion 47b is a horizontal plate formed by cutting out a part of the plate member 41. The second locking portion 47b is provided on the engagement arm 46 to overlap with the same and interposed between the first locking portion 46b and the arm base 46a. Thus, the second locking portion 47b faces the first locking portion 46b with the end surfaces. Thus, the arm support portion 47 vertically sandwiches the engagement arm 46 with the guide piece 47a and the second locking portion 47b.

Therefore, the bridge portions 45 are joint portions connecting the plate members 41, 42 so as to be slidable in the right and left direction corresponding to the gap between the end surfaces between the first locking portion 46b and the second locking portion 47b. More specifically, the bridge portions 45 couple the adjacent plate members 41, 42 so as to be slidable in the predetermined slide range. As illustrated in FIG. 4A, the bridge portions 45 may be structured so that right and left are reversed. In this case, the engagement arm 46 is provided on the other plate member 41 side and the arm support portion 47 is provided on the one plate member 42 side. The bridge portions 45 between the plate members 40, 41 also have substantially the same configuration as that of the bridge portions 45 illustrated in FIGS. 6A and 6B.

As illustrated in FIG. 4B, the plate boundary portions B are provided along the positions overlapping with portions under the frame portions 28 of the frame 26 in the base plate 30. Specifically, the plate boundary portions B pass portions under the horizontal frames 28b and the vertical frames 28c while avoiding portions under the hole portions 28a. The bridge portions 44, 45 are also provided at the positions overlapping with the portions under the horizontal frames 28b and the vertical frames 28c. Thus, the bridge portions 44, 45 are prevented from interfering with a vertical operation of each keytop 24.

As illustrated in FIG. 4A, fastening holes 50, 51, 52 penetrating in the plate thickness direction are formed in various places of the base plate 30.

A large number of fastening holes 50 are formed in various places of each of the plate members 40 to 42. The fastening holes 50 are individually formed at the positions overlapping with the portions under the frame portions 28 of the frame 26. As illustrated in FIG. 3, a screw portion 39a of the screw 39 is passed through each fastening hole 50. The screw portion 39a is screwed into a screw hole 28d opened and formed in the lower surface of the frame portion 28.

As illustrated in FIGS. 4A and 4B, 5A, and 6A, two or more of the fastening holes 51 are formed at the positions overlapping with the plate boundary portions B. Each fastening hole 51 is formed by semicircular notch-shaped portions 51a, 51b formed in the end surfaces 41a, 42a of the adjacent plate members 41, 42, respectively. More specifically, the fastening hole 51 has a structure in which a gap between the facing notch-shaped portions 51a, 51b and a gap formed by the plate boundary portion B are united.

As illustrated in FIGS. 5B and 7, the screw portion 39a of the screw 39 is passed through each fastening hole 51. The screw portion 39a is screwed into the screw hole 28d opened and formed in the lower surface of the frame portion 28. At this time, a head portion 39b simultaneously abuts on the lower surfaces 30b of the left and right plate members 41, 42 forming the plate boundary portion B in the screw 39. As a result, the keyboard device 10 has a structure in which one screw 39 simultaneously fastens the two plate members 41, 42 to the frame 26. The plate members 40, 41 are also fastened to the frame 26 with the screws 39 as in the case of the plate members 41, 42 described above by the fastening holes 51 provided in the plate boundary portion B therebetween.

As illustrated in FIGS. 4A and 4B, 5A, and 6A, the fastening hole 52 is formed in the arm base 46a of the engagement arm 46 configuring each bridge portion 45. As illustrated in FIG. 5B, the screw portion 39a of the screw 39 is passed through each fastening hole 52 and screwed into the screw hole 28d of the frame portion 28 as with a configuration example of FIG. 7. At this time, the head portion 39b presses the arm base 46a upward from the bottom in the screw 39. Therefore, in the bridge portion 45, the engagement arm 46 is fastened with the screw 39, whereby the arm support portion 47 vertically sandwiching the same is simultaneously fastened to the frame 26 with the one screw 39. Specifically, the engagement arm 46 is pressed upward from the bottom with the screw 39, whereby the first locking portion 46b presses the guide piece 47a provided on the upper surface side thereof. Thus, the plate members 41, 42 are simultaneously fastened to the frame 26. The plate members 40, 41 are also fastened to the frame 26 with the screws 39 as in the case of the plate members 41, 42 described above by the fastening holes 52 provided in the bridge portion 45 between the plate members 40, 41.

Figure 8:
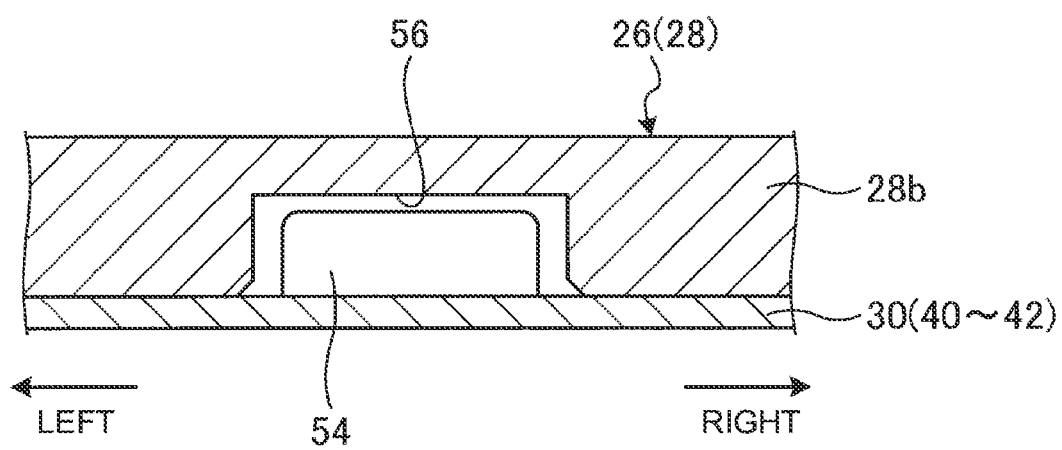
FIG. 8 is a plan view schematically illustrating a state where the base plate and the frame are positioned with a positioning fitting portion.

As illustrated in FIGS. 4A and 4B, the plate members 40 to 42 each have positioning fitting portions 54 in various places. FIG. 8 is a plan view schematically illustrating a state where the base plate 30 and the frame 26 are positioned by the positioning fitting portion 54.

As illustrated in FIG. 4A, two or more of the positioning fitting portions 54 are provided in each of the plate members 40 to 42. The positioning fitting portion 54 is a plate piece obtained by cutting and raising a part of each of the plate members 40 to 42, and then erecting the part upward. The positioning fitting portion 54 has a width dimension extending in the right and left direction, for example. The positioning fitting portion 54 is provided at a position overlapping with the portion under the frame portion 28 and is fitted to a fitting concave portion 56 opened to the lower surface of the frame portion 28. Thus, the positioning fitting portions 54 position the plate members 40 to 42 with rattling in the predetermined range (e.g., about 0.1 mm in total in the forward and rearward direction) with respect to the forward and rearward direction. Furthermore, the positioning fitting portions 54 position the plate members 40 to 42 with rattling in the predetermined range (e.g., 0.1 mm in total in the right and left direction) with respect to the right and left direction. The positioning fitting portions 54 may be provided at least substantially in the center in the right and left direction of each of the plate members 40 to 42. In the case of this embodiment, with respect to the positioning fitting portions 54 in the center of each of the plate members 40 to 42, three positioning fitting portions 54 are provided along the forward and rearward direction in each of the plate members 40 to 42, for example (see FIG. 4A).

When the base plate 30 is fixed to the frame 26 in the keyboard device 10 of this embodiment, the positioning fitting portions 54 of the plate members 40 to 42 are first fitted to the fitting concave portions 56 of the frame 26. Thus, the base plate 30 is positioned to the frame 26 while the relative positions between the plate members 40 to 42 are being displaced through the bridge portions 44, 45 according to the positions of the fitting concave portions 56 of the frame 26. At this time, each keytop 24 is inserted into each hole portion 28a. Subsequently, the screws 39 are screwed into the screw holes 26d of the frame 26 through the fastening holes 50 to 52. Thus, the plate members 40 to 42 are fastened to the frame 26, so that assembly work of the keyboard device 10 is completed.

The base plate 30 of this embodiment has the divided structure by the plate members 40 to 42. Therefore, in the base plate 30, the dimensional tolerance in the longitudinal direction (right and left direction) thereof can be set by a value according to the dimension in the right and left direction of each of the plate members 40 to 42. More specifically, the dimensional tolerance of each of the plate members 40 to 42 having a short length can be set to be smaller than the dimensional tolerance in the case of configuring the base plate 30 with a long plate, and thus the dimensional accuracy is improved. For example, when the base plate 30 is a single plate and has a right and left dimension of 300 mm, the dimensional tolerance in the right and left direction is required to be 0.2 mm or more. However, the dimensional tolerance in the right and left direction of each of the plate members 40 to 42 of a three-divided structure may be about 0.1 to 0.15 mm. The plate members 40 to 42 are relatively movable in the arrangement direction through the bridge portions 44, 45. Therefore, a gap C (see FIG. 2) between the hole portion 28a of the frame 26 and each keytop 24 supported by the plate members 40 to 42 can be set to the size based on the dimensional tolerance with high accuracy described above. As a result, the gaps C between the keytops 24 and the frame 26 can be reduced.

Even with such small gaps C can prevent the keytops 24 from interfering with the frame 26, and thus a smooth operation thereof can be secured.

The keyboard device 10 is provided with the base plate of such a divided structure. Hence, the screws 39 fastened to the fastening holes 51, 52 are provided at the positions overlapping with the plate boundary portion B formed between the facing end surfaces 40a, 41a (41a, 42a) of the adjacent plate members 40, 41 (41, 42), respectively. In the fastening holes 51, 52, the one screw 39 simultaneously fastens the adjacent plate members 40, 41 (41, 42) to the frame 26.

Therefore, according to the keyboard device 10, one screw 39 can simultaneously fix edge portions of the adjacent plate members 40, 41 (41, 42). As a result, the keyboard device 10 can reduce the number of the used screws 39 and the number of processes of the fastening work of the screws 39. Moreover, the screws 39 are disposed at the positions overlapping with the plate boundary portions B. Therefore, the edge portions (portions along the end surfaces 40a, 41a, 42a) of the plate members 40 to 42 are fixed to the frame 26 with high rigidity. Therefore, the keyboard device 10 can suppress the sinking of the edge portions of the plate members 40 to 42 in the depressing operation of the keytops of the keytops 24 and can obtain a high feeling of operation. Moreover, the screws 39 are prevented from interfering with the vertical operation of the keytops 24. As a result, the keyboard device 10 can secure the rigidity of the base plate 30 while sufficiently securing the stroke of each keytop 24. Furthermore, the keyboard device 10 can also achieve a reduction in cost or weight. As the fastening tool fastening the base plate 30 to the frame 26, fastening tools other than the screw 39, such as a rivet, may be used, for example.

In particular, in the keyboard device 10, the plate boundary portions B also have the zigzag shape bent in the forward and rearward direction and the right and left direction according to the arrangement of the keytops 24. Therefore, corner portions (projected corner portions A) projecting in accordance with the zigzag shape of the plate boundary portions B are formed in parts of each of the plate members 40 to 42 (see FIGS. 4A and 5A). For example, a portion in the range where fine dots are given in FIG. 5A is the projected corner portion A. The projected corner portion A receives downward pressing force when the keytop 24 is operated to depress because the keytop 24 is disposed thereon. At this time, in the projected corner portion A, the adjacent two sides among the four peripherals face the plate boundary portion B, and therefore a concern of sinking downward by the pressing force of the keytop 24 is larger than the concern in the other portions. When the sinking of the base plate 30 occurs, the keytop 24 is bounced, so that the feeling of operation decreases. In this point, the keyboard device 10 is provided with the fastening holes 51 or the fastening holes 52 in the range of the projected corner portions A and the projected corner portions A are fixed with the screws 39. Therefore, the sinking of the projected corner portions A in the depressing operation of the keytop 24 can also be suppressed, so that a feeling of operation with high rigidity can be obtained. In the case of conventional configurations not having the fastening holes 51, 52, there is a necessity of securing installation space of fastening holes and screws forming a pair in edge portions between adjacent plate members in screw-fixing projected corner portions and the vicinity thereof, which is structurally difficult to achieve in many cases.

As the fastening hole 51, the gap of the plate boundary portion B as it is may be acceptable without providing the notch-shaped portions 51a, 51b. However, in the case of the configuration of not providing the notch-shaped portions 51a, 51b, there arises the necessity of enlarging the width of the plate boundary portion B. Thus, there is a concern that it becomes difficult to secure the coupling strength, for example, of the plate members 40 to by the bridge portions 44, 45. Therefore, it is preferable that the fastening hole 51 is configured to have the notch-shaped portions 51a, 51b.

The electronic apparatus 12 has a structure of fastening the base plate 30 from the lower surface side of the frame 26 as illustrated in FIGS. 3 and 7. The keyboard device 10 has a mounting structure of being suspended from the lower surface side of the cover member 14a of the main body chassis 14 through the base plate 30. Therefore, the base plate 30 is in a state where the lower surface 30b side floats in the main body chassis 14, and thus it becomes more important to secure the rigidity thereof. In this point, higher rigidity is secured in the keyboard device 10 by a fixing structure of the screws 39 by the fastening holes 50 to 52 and further a fixing structure in the projected corner portions A.

In the keyboard device 10, the plate members 40 to 42 are relatively movable in the arrangement direction through the bridge portions 44, 45. Therefore, the base plate 30 can be dealt with as a single plate in producing the keyboard device 10, and thus the manufacturing efficiency is high. The plate members 40 to 42 may have a completely independent structure without being coupled with the bridge portions 44, 45. In this configuration, contact portions are formed between the end surfaces 40a, 41a and between the end surfaces 41b, 42a, so that the plate boundary portions B are formed also including the contact portions.

It is a matter of course that the present invention is not limited to the embodiments described above and can be freely altered without deviating from the scope of the present invention.

Although the description above describes the configuration in which the base plate 30 is formed with the three plate members 40 to 42 as an example, the installation number of the plate members may be two or four or more.

Although the description above describes the configuration in which the plate members 40 to 42 are arranged along the longitudinal direction (right and left direction) of the base plate 30 as an example, a configuration may be acceptable in which the plate members are arranged along the lateral direction (forward and rearward direction) together with the longitudinal direction or in place of the longitudinal direction. When the keyboard device 10 has a square shape as viewed in plan, both the forward and rearward direction and the right and left direction can be referred to as the longitudinal direction. A configuration may be acceptable in which the plate members are arranged in either or both of the forward and rearward direction or/and the right and left direction.

The invention claimed is:
1. A keyboard device comprising:
a base plate having a plurality of plate members;
a plurality of keytops vertically movable and supported on an upper surface side of the base plate;
a frame attached to the upper surface side of the base plate and having a plurality of hole portions into which the keytops are vertically movable;
a plurality of fastening holes at a position overlapping with a plate boundary portion and simultaneously fastening the plate members to the frame; and
a bridge portion having an engagement arm that has an arm base and an arm support portion, wherein the arm base has a base planar portion and, extending therefrom, a base end portion, wherein the base end portion is configured to hook onto an edge of a slot in one of the plate members and the base planar portion is configured to lay flat on the one of the plate members when the base end portion is hooked onto the edge of the slot in the one of the plate members, wherein the arm support portion has a support planar portion and, extending therefrom, a support end portion, wherein the support end portion is configured to hook onto an edge of another slot in another one of the plate members and the support planar portion is configured to lay flat on the another one of the plate members when the support end portion is hooked onto the edge of the another slot in the another one of the plate members, and the plurality of the fastening holes includes a first fastening hole in the engagement arm, the first fastening hole is configured to fasten the engagement arm to the frame.

2. The keyboard device according to claim 1, wherein:

the plate boundary portion has a zigzag shape in a forward and rearward direction and in a right and left direction of the keyboard device, and in which a projected corner portion formed by the zigzag shape is in the one of the plate members or in the another one of the plate members, and the plurality of the fastening holes is at a position at least overlapping with the plate boundary portion forming the projected corner portion.

3. The keyboard device according to claim 1, wherein:

the one of the plate members and the another one of the plate members each have a notch-shaped portion in a respective end surface, and the notch-shaped portions of such plate members face each other, and the plurality of the fastening holes comprising a second fastening hole formed between the notch-shaped portions facing each other.

4. The keyboard device according to claim 1, further comprising:

a screw having a screw portion and a head portion, and in the screw, the screw portion passes through the plate boundary portion and the head portion abuts each of the one of the plate members and the another of the plate members.

5. The keyboard device according to claim 1, wherein:

the base plate has a joint portion connecting the one of the plate members and the another of the plate members so as to be slidable in a predetermined slide range along an arrangement direction of such plate members, and the joint portion straddles the plate boundary portion, and the joint portion is fastened to the frame by a fastening tool.

6. An electronic apparatus, comprising:

a keyboard device having:

a base plate having a plurality of plate members;

a plurality of keytops vertically movable and supported on an upper surface side of the base plate;

a frame attached to the upper surface side of the base plate and having a plurality of hole portions into which the keytops are vertically movable;

a plurality of fastening holes at a position overlapping with a plate boundary portion and simultaneously fastening the adjacent plate members to the frame; and a bridge portion having an engagement arm that has an arm base and an arm support portion, wherein the arm base has a base planar portion and, extending therefrom, a base end portion, wherein the base end portion is configured to hook onto an edge of a slot in one of the plate members and the base planar portion is configured to lay flat on the one of the plate members when the base end portion is hooked onto the edge of the slot in the one of the plate members, wherein the arm support portion has a support planar portion and, extending therefrom, a support end portion, wherein the support end portion is configured to hook onto an edge of another slot in another one of the plate members and the support planar portion is configured to lay flat on the another one of the plate members when the support end portion is hooked onto the edge of the another slot in the another one of the plate members, and the plurality of the fastening holes includes a first fastening hole in the engagement arm, the first fastening hole is configured to fasten the engagement arm to the frame;

a main body chassis with the keyboard device; and a display chassis rotatably coupled to the main body chassis and having a display.

7. The electronic apparatus according to claim 6, wherein:

the frame is a cover member forming an upper surface of the main body chassis, and the base plate is attached to the main body chassis and suspended from a lower surface side of the cover member by being fastened to the cover member with a fastening tool.

* * * * *